(12) United States Patent
Komaki

(10) Patent No.: US 7,414,743 B2
(45) Date of Patent: Aug. 19, 2008

(54) PRINT CONTROL APPARATUS, METHOD AND PROGRAM USING A TAG OF A DOCUMENT LIST FOR PRINTING A PLURALITY OF DOCUMENTS IN VARIOUS FORMATS

(75) Inventor: Yoshio Komaki, Kobe (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 976 days.

(21) Appl. No.: 10/401,736

(22) Filed: Mar. 31, 2003

(65) Prior Publication Data

US 2003/0184789 A1 Oct. 2, 2003

(30) Foreign Application Priority Data

Apr. 1, 2002 (JP) ............................ P2002-098658

(51) Int. Cl.
*G06F 15/00* (2006.01)
*B41B 1/00* (2006.01)

(52) U.S. Cl. ..................... 358/1.13; 358/1.15; 709/219

(58) Field of Classification Search ................ 358/1.13, 358/1.15; 710/105; 709/224, 219
See application file for complete search history.

(56) References Cited

U.S. PATENT DOCUMENTS 6,166,826 A * 12/2000 Yokoyama ................. 358/1.16

| | | | |
|---|---|---|---|
| 6,917,436 B2 * | 7/2005 | Bates et al. ................. | 358/1.15 |
| 2002/0036788 A1 * | 3/2002 | Hino .......................... | 358/1.11 |
| 2002/0111963 A1 * | 8/2002 | Gebert et al. ............... | 707/513 |
| 2003/0016387 A1 * | 1/2003 | Takagi et al. ............... | 358/1.15 |
| 2004/0015566 A1 * | 1/2004 | Anderson et al. ........... | 709/219 |

FOREIGN PATENT DOCUMENTS

JP 2000-318254 11/2000
JP 2003-084951 3/2003

* cited by examiner

*Primary Examiner*—Kimberly A Williams
(74) *Attorney, Agent, or Firm*—Buchanan Ingersoll & Rooney PC

(57) ABSTRACT

The present invention provides a print control technique for printing a plurality of documents more flexibly. A document list obtaining unit in an MFP (Multi Function Peripheral) obtains a document list DL of a plurality of documents to be printed. The document list DL is described by, for example, the XML (extensible Markup Language) or the like. A style sheet obtaining unit obtains a style sheet ST corresponding to the document list DL from a style sheet storing unit or the like. A converting unit converts the document list DL to a printing list PL of a predetermined format by using the tag in the document list DL on the basis of the style sheet ST. On the basis of the printing list PL, a printing instruction unit uses the document data obtained by a document data obtaining unit and outputs a printing instruction to a printer unit. The printer unit continuously prints the plurality of documents onto sheets on the basis of the printing instruction.

26 Claims, 10 Drawing Sheets

F I G . 1
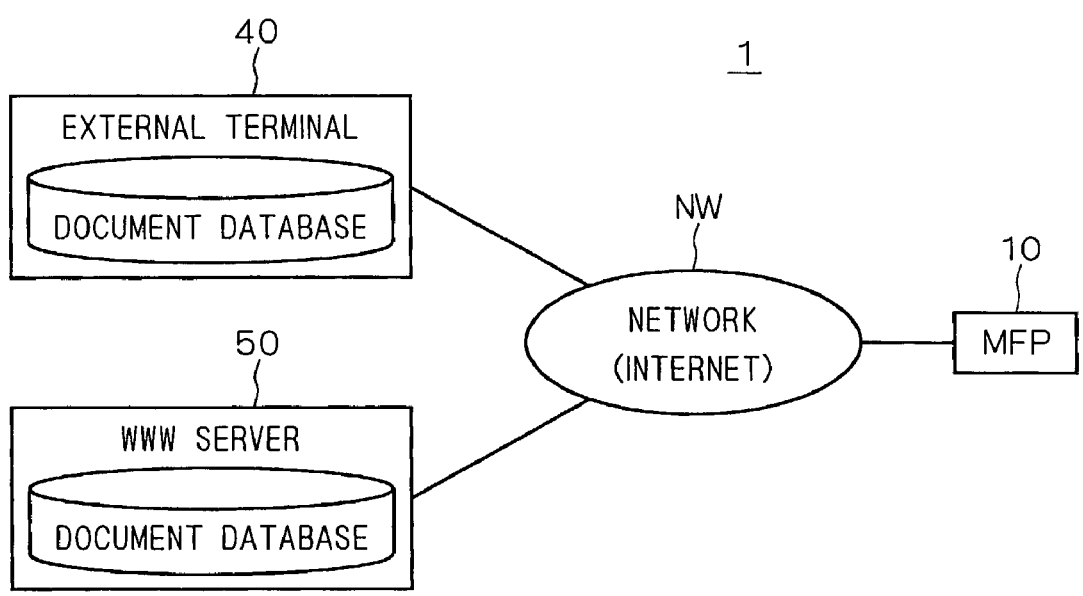

```
<stylesheet>

<template match="/">
<printing list>
<apply-templates select = "document list/cover/file"/>
<apply-templates select = "document list/document/file"/>
</printing list>
</template>

<templates match = "document list/cover/file">
<document>
<sheet size>A3</sheet size>
<operation mode>COLOR</operation mode>
<file>
        <value-of select="./>
</file>
</document>
</template>

<templates match = "document list/document/file">
<document>
<sheet size>A4</sheet size>
<operation mode>MONOCHROME</operation mode>
<file>
        <value-of select="./>
</file>
</document>
</template>

</stylesheet>
```

QT: first template block
QA: second template block
QB: third template block

<printing list>
        <document>
                <sheet size>A3</sheet size>
L1              <operation mode>COLOR</operation mode>
                <file>book1.doc</file>
        </document>
        <document>
                <sheet size>A4</sheet size>
L2              <operation mode>MONOCHROME</operation mode>
                <file>book2.doc</file>
        </document>
        <document>
    •       ..........
    •   </document>
    •   ..........
    •   <document>
                <sheet size>A4</sheet size>
LN              <operation mode>MONOCHROME</operation mode>
                <file>bookN.doc</file>
        </document>
</printing list>
```

FIG. 10

```
<?xml-stylesheet type="text/xsl" href="prn1.xsl"?>
<document list>
    <cover>
        <information>
            <title>No. 1</title>
            <writer>A</writer>
            <date>2003/04/01</date>
        </information>
        <file>book1.doc</file>
    </cover>
    <document>
        <information>
            <title>No. 2</title>
            <writer>B</writer>
            <date>2003/04/02</date>
        </information>
        <file>book2.doc</file>
    </document>
    <document>
        ..........
    </document>
    ..........
    <document>
        <information>
            <title>No. N</title>
            <writer>Z</writer>
            <date>2003/04/01</date>
        </information>
        <file>bookN.doc</file>
    </document>
</document list>
```

DL(DL2)

PRINT CONTROL APPARATUS, METHOD AND PROGRAM USING A TAG OF A DOCUMENT LIST FOR PRINTING A PLURALITY OF DOCUMENTS IN VARIOUS FORMATS

This application is based on application No. 2002-098658 filed in Japan, the contents of which are hereby incorporated by reference.

BACKGROUND OF THE INVENTION

1. Field of the Invention

The present invention relates to a print control technique for printing a plurality of documents.

2. Description of the Background Art

Conventionally, at the time of printing a plurality of documents, a document list in a predetermined format of a plurality of documents to be printed is generated (for example, see Japanese Patent Application Laid-Open No. 2000-318254).

Concretely, a print control unit analyzes the document list of the predetermined format and gives a printing instruction to a printing engine (printing output unit) so as to automatically and sequentially print the plurality of documents. By the instruction, the printing engine can continuously print the plurality of documents and output the resultant printed documents. At the time of printing a plurality of documents, therefore, the operator can save time and effort to designate the next document to be printed each time printing of one document is finished.

However, since such a document list has to be adapted to only one predetermined format, there is a problem in that the creator of a document list does not have freedom. In other words, due to this constraint, the document list is not easy to use.

SUMMARY OF THE INVENTION

An object of the present invention is to provide a printing control technique for printing a plurality of documents more flexibly.

The present invention is directed to an apparatus for controlling a printer.

According to the present invention, an apparatus for controlling a printer comprises: a first obtaining unit for obtaining a document list of a plurality of documents to be printed, the document list being a text document with a tag; a second obtaining unit for obtaining a style sheet corresponding to the document list; and a processing unit for converting the document list into a printing list of a predetermined format by using the tag in the document list on the basis of the style sheet.

Since a document list may be of any form as long as it can be converted into a printing list of a predetermined format on the basis of a corresponding style sheet, a requirement of the format of a document list is alleviated. Therefore, the apparatus can print a plurality of documents by using document lists of various formats.

The present invention is also directed to a computer program product.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram showing a general configuration of a print system;

FIG. 8 shows an example of the style sheet ST;

FIG. 9 shows an example of the printing list PL; and

FIG. 10 shows another document list DL (DL2).

DESCRIPTION OF THE PREFERRED EMBODIMENTS

Hereinafter, embodiments of the present invention will be described with reference to the drawings.

A. System Configuration and the Like

A1. General Configuration

FIG. 1 is a schematic diagram showing a general configuration of a print system 1 according to an embodiment of the present invention. The print system 1 has a multi function peripheral (hereinafter, abbreviated as "MFP") 10, an external terminal 40, and a server 50.

Each of the MFP 10, external terminal 40 and server 50 is connected to a network NW and can transmit/receive various data such as document data DD, a document list DL and a style sheet ST (which will be described later) to/from each other via the network NW. The "network" is a communication line network for performing data communication and, concretely, is constituted by any of various communication line networks constructed by electric communication lines (including optical communication lines), such as LAN, WAN and the Internet. A form of connection to the network may be a constant connection using a dedicated line or the like or a temporary connection such as a dial-up connection using a public telephone line such as an analog line or a digital line (ISDN). The transmission method may be a radio (wireless) method or a wired method.

The MFP 10 is a composite device having the functions of a scanner, a copier, a printer, a facsimile and the like, and can transmit/receive data via the network. As will be described later, the MFP 10 functions as a print control apparatus according to an embodiment of the present inventions, and also functions as a print output apparatus. By these functions, the MFP 10 can print a plurality of documents on the basis of a received document list, as will be described later.

The external terminal 40 is a network terminal which can be connected to (coupled with) the network NW and can perform communication with the MFP 10 via the network. For example, a personal computer, a portable telephone, a digital camera, an MFP or the like functions as the external terminal 40. The external terminal 40 has a document database DB. The document database DB has a plurality of pieces of document data as data of documents, and a document list of a plurality of documents to be printed out of the plurality of documents.

The server 50 is a WWW (World Wide Web) server on the like connected to the network and can perform communication in conformance with a protocol such as HTTP (HyperText Transfer Protocol) with the MFP 10. The MFP 10 can receive various documents from the server 50 using the protocol such as HTTP. The server 50 also has a document database DB as described above.

The MFP 10 converts the document list DL received from an external device (such as the external terminal 40 or server 50) into the printing list PL of the predetermined format and, after that, prints and outputs a plurality of documents onto sheets on the basis of the printing list PL.

A2. MFP

Figure 2:
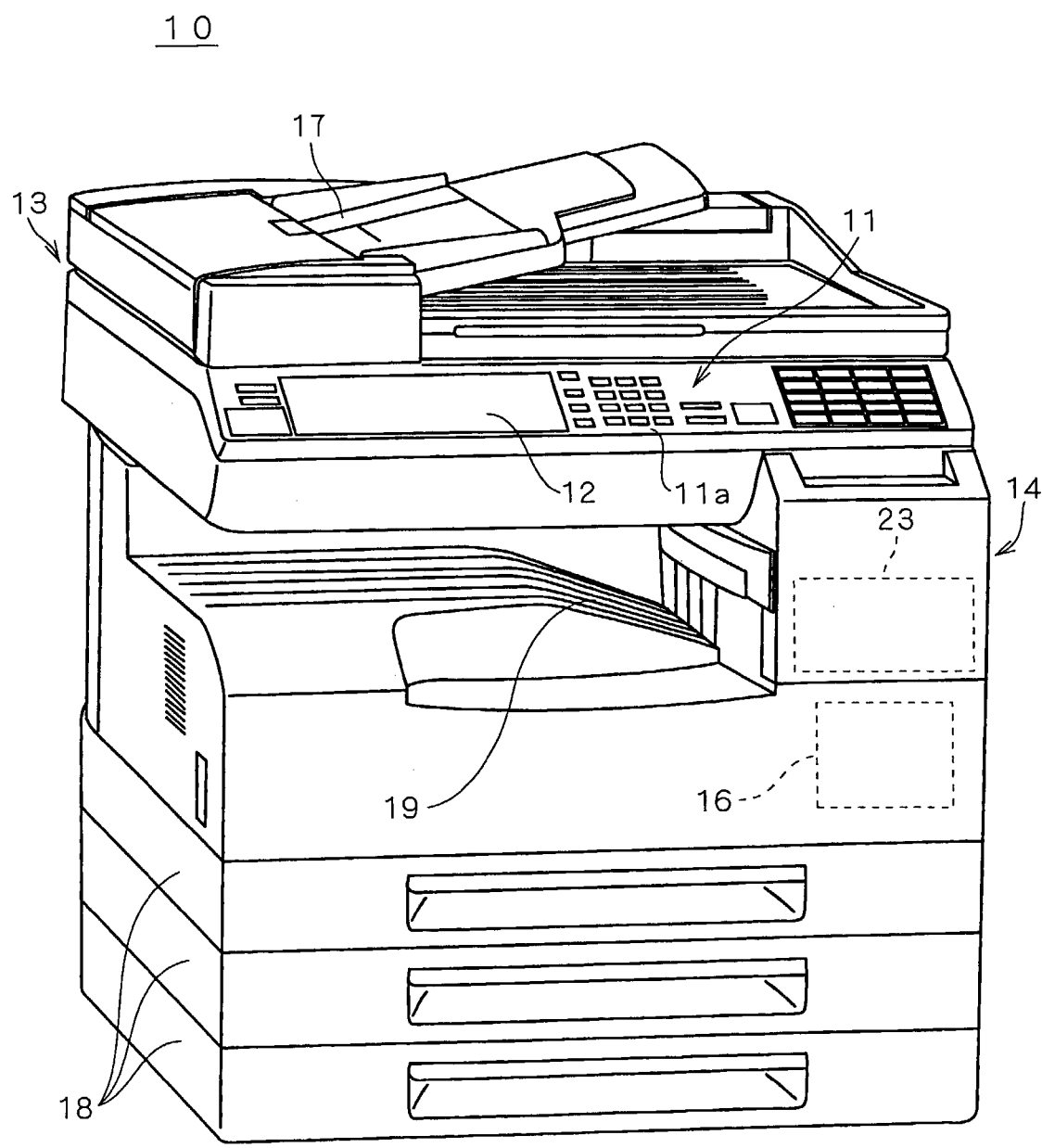
FIG. 2 is an external view of an MFP (Multi Function Peripheral)

FIG. 2 is an external view of the MFP 10.

As shown in FIG. 2, the MFP 10 includes: an operating unit 11 having a plurality of keys 1a for receiving inputs of various instructions and data such as characters and numbers by a user operation of the keys; a display 12 for displaying information such as an instruction menu to the user and an obtained image; a scanner unit 13 for photoelectrically reading an original and obtaining image data; and a printer unit (also referred to as "print output unit" or "print engine") 14 for printing an image onto a recording sheet on the basis of the obtained image data.

The MFP 10 also includes: a feeder unit 17 which is provided on the top face of the body and feeds an original to the scanner unit 13; a paper feeding unit 18 which is provided in the lower part and supplies a recording sheet to the printer unit 14; a tray 19 which is provided in the center part and to which a recording sheet on which an image is printed by the printer unit 14 is ejected; a communication unit 16 which is provided on the inside and transmits/receives image data or the like to/from an external device via the network; and a storing unit 23 for storing the image data or the like.

The display 12 is used for displaying various images including a list of data transmission destinations, and the operating unit 11 is used for various inputs including selection of a transmission destination by the user. The display 12 is constructed as a liquid crystal type panel having a touch sensor or the like therein and can detect a position where an operator's finer or the like touches in the display 12. The operator can therefore enter various instructions by depressing (i.e., applying pressure to) various virtual buttons and the like displayed in the display 12 with his/her finer or the like. The display 12 also has such an operation input function. The operating unit 11 and the display 12 function as main components of the user interface.

The scanner unit 13 obtains image data by photoelectrically reading image information of a picture, characters, a painting and the like form an original. The obtained image data (density data) is converted to digital data by an image processing unit (not shown) and subjected to various well-known image processes. After that, the resultant image data is transmitted to the printer unit 14 or communication unit 16 where the image is printed or data is transmitted, or stored into the storing unit 23 so as to be used later.

The printer unit 14 prints an image onto a recording sheet on the basis of the image data obtained by the scanner unit 13, the image data received from an external device by the communication unit 16, or the image data stored in the storing unit 23. The printer unit 14 can print not only the image data but also document data received from an external device or the like. As described above, the printer unit 14 is a print output unit for performing various print outputs. As will be described later, the printer unit 14 can also print a plurality of documents continuously on the basis of a printing list converted from a document list.

The communication unit 16 transmits/receives facsimile data via a public telephone line and transmits/receives data by using an electronic mail or the like to/from an external device connected to a network such as a LAN or the Internet via the network. Consequently, the MFP 10 has not only the function of a facsimile apparatus for performing normal facsimile communication but also the function of a data transmitting/receiving apparatus for transmitting/receiving data in various forms which are not limited to image data to/from an external device or the like.

Figure 3:
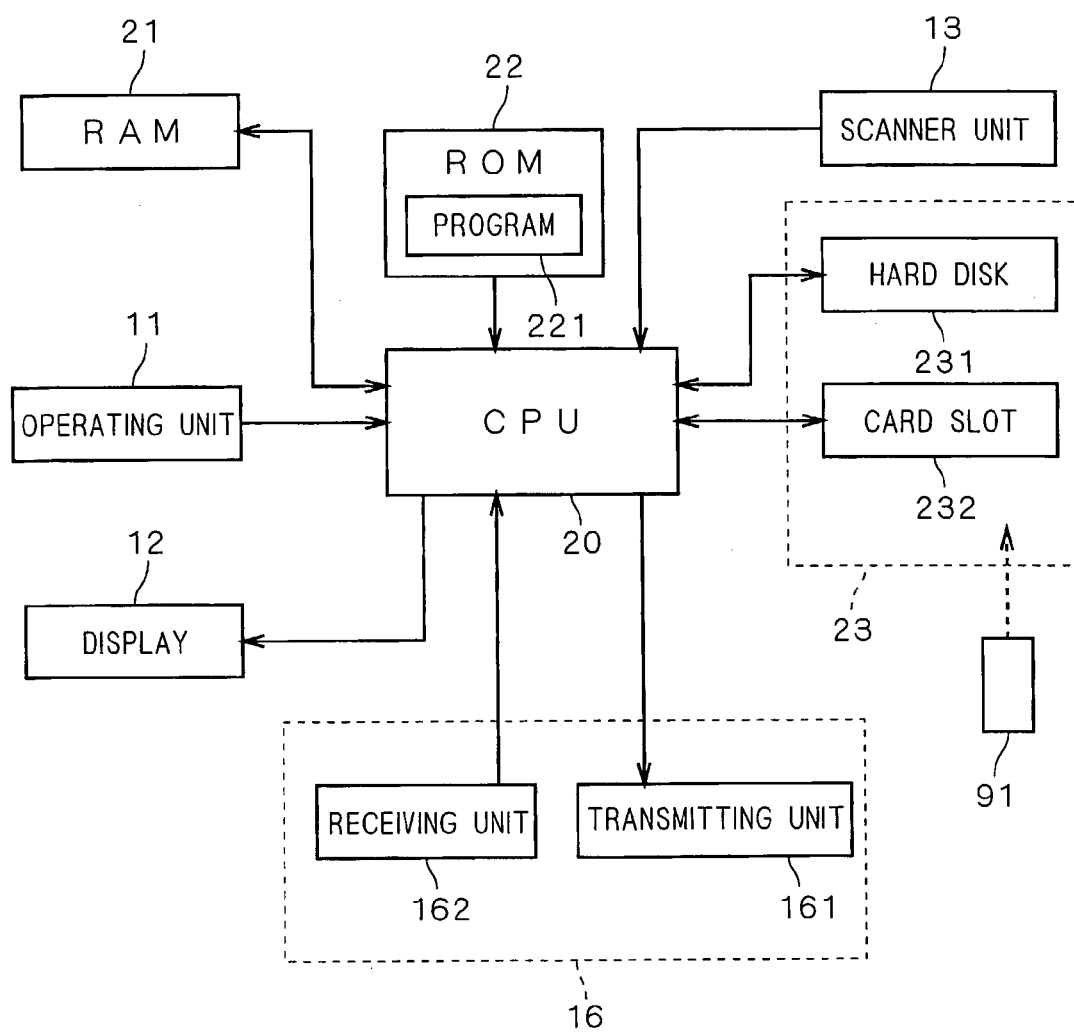
FIG. 3 is a block diagram showing a part of the hardware configuration of the MFP.

FIG. 3 is a block diagram showing a part of a hardware configuration of the MFP 10. The MFP 10 includes a CPU 20 for performing various computing processes and controlling the whole operation of the MFP 10. A RAM 21 for storing various data and a ROM 22 for storing a predetermined software program (hereinafter, simply referred to as "program") 221 are connected to the CPU 20. To the CPU 20, the operating unit 11, display 12, scanner unit 13 and storing unit 23 are also connected. The storing unit 23 is constructed by a hard disk 231 for storing image data and the like and a card slot 232 for reading information from a memory card 91. The RAM 21 is a nonvolatile memory (nonvolatile RAM).

With the configuration, under the control of the CPU 20, various data can be transmitted/received among the RAM 21, scanner unit 13, hard disk 231, and the memory card 91 inserted into the card slot 232. On the display 12, by the control of the CPU 20, information stored in the RAM 21, hard disk 231 and memory card 91 is displayed.

Further, to the CPU 20, the communication unit 16 having a transmitting unit 161 and a receiving unit 162 for transmitting/receiving data to/from an external device connected via the network is also connected.

As described above, the MFP 10 is constructed as a computer system (hereinafter, simply referred to as "computer") having the CPU 20 and the like. When a predetermined program (the program 221) is executed in such a computer, the MFP 10 functions as a print control apparatus having functions which will be described later.

Although the program 221 is stored in the ROM 22 in the present embodiment, the program 221 may be stored in the RAM 21 or hard disk 231. A program to be stored in the RAM 21 or hard disk 231 may be obtained by, for example, reading a program recorded in the memory card 91 as a recording medium from the memory card 91. Alternately, such a program may not be read directly from a recording medium such as the memory card 91 but may be loaded from an external device into the MFP 10 by communication via the network.

Figure 4:
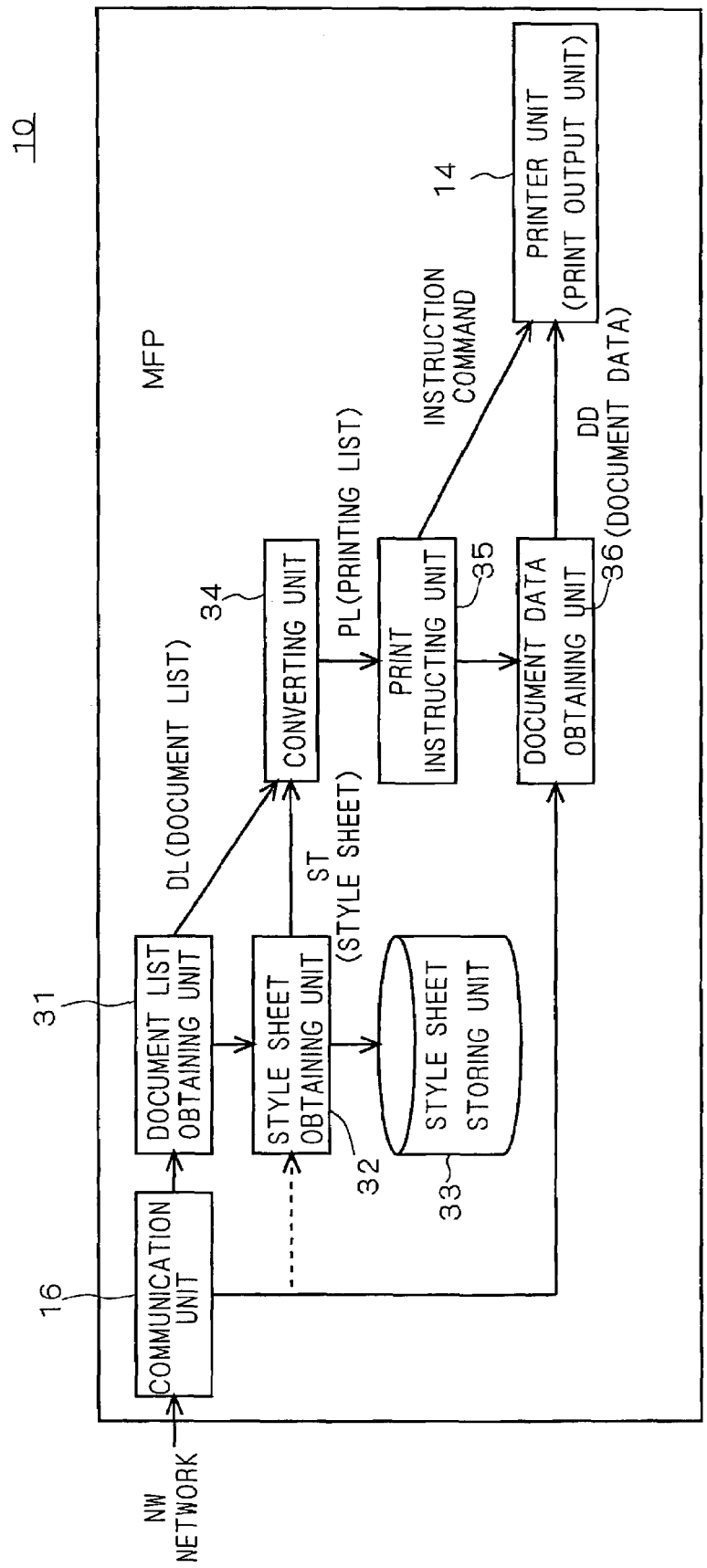
FIG. 4 is a functional block diagram of the MFP.

FIG. 4 is a functional block diagram showing various functions in the MFP 10. As shown in FIG. 4, the MFP 10 includes, in addition to the printer unit 14 and the communication unit 16, a document list obtaining unit 31, a style sheet obtaining unit 32, a style sheet storing unit 33, a converting unit 34, a print instructing unit 35 and a document data obtaining unit 36. The units are realized functionally by using hardware resources of the CPU 20, RAM 21, ROM 22, storing unit 23 and the like. The operations of the units will be described in detail.

B. Operations

Figure 5:
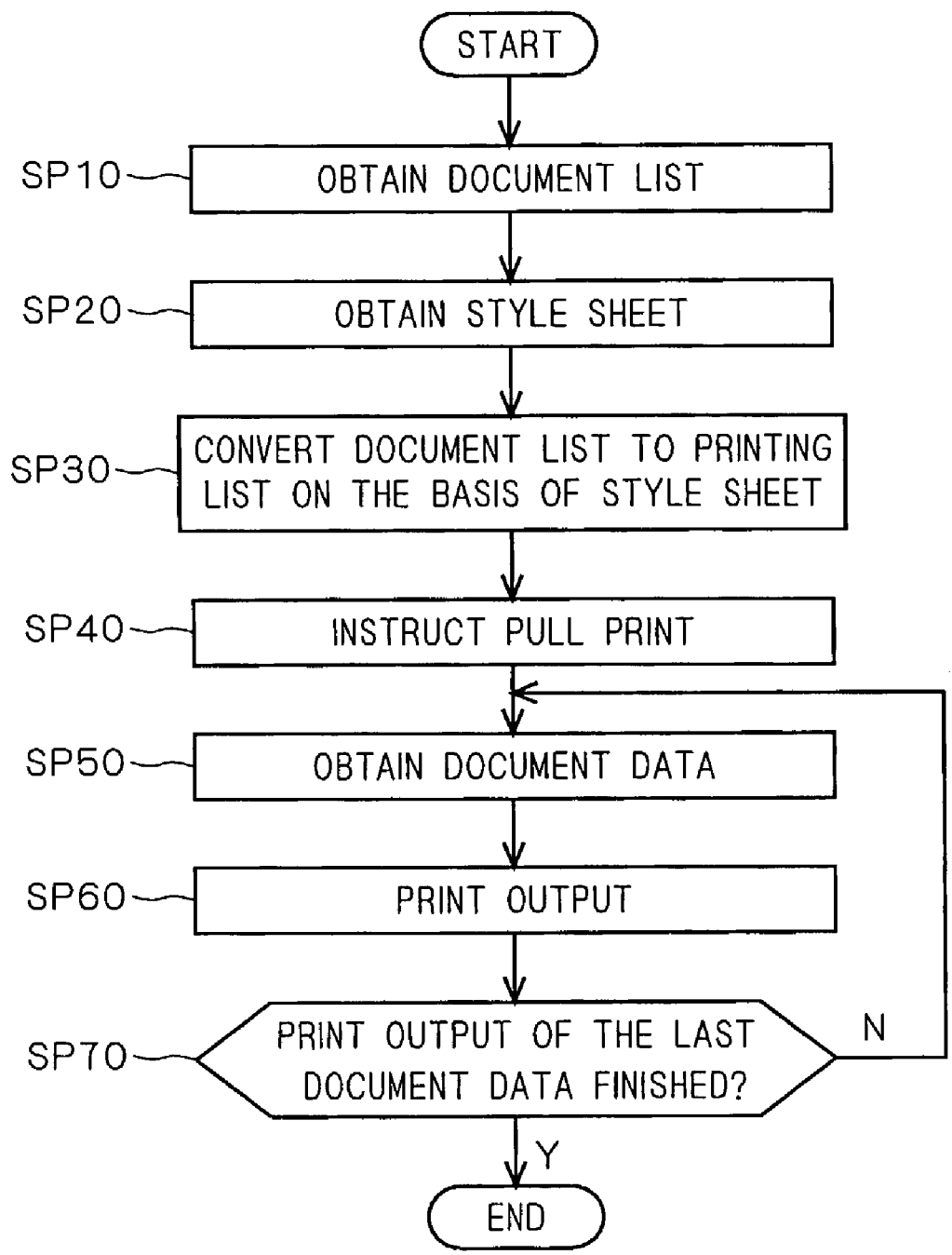
FIG. 5 is a flowchart showing the operation of the MFP.
Figure 6:
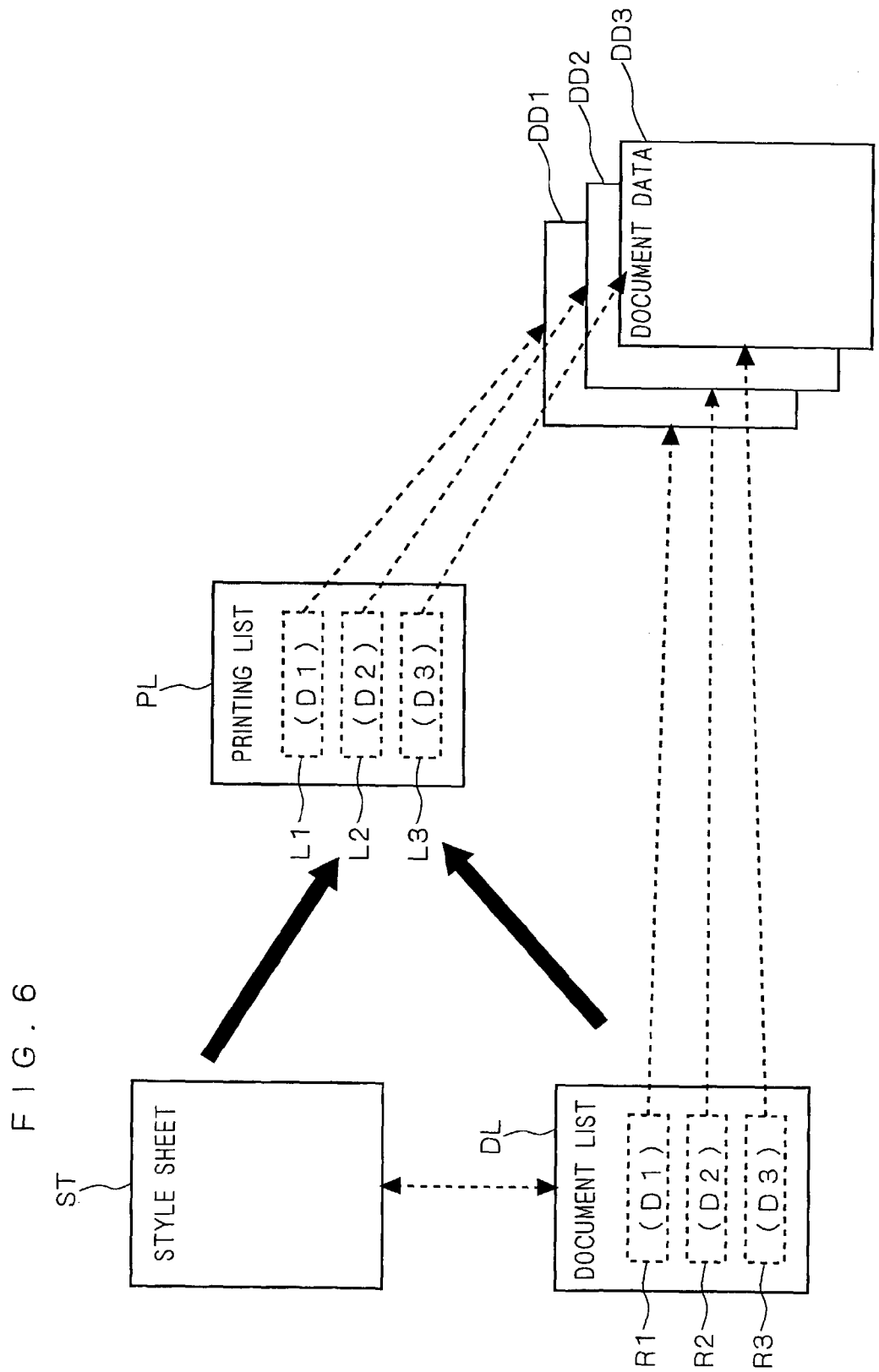
FIG. 6 shows the relationship among a document list DL, a style sheet ST, a printing list PL and document data DD.
Figure 7:
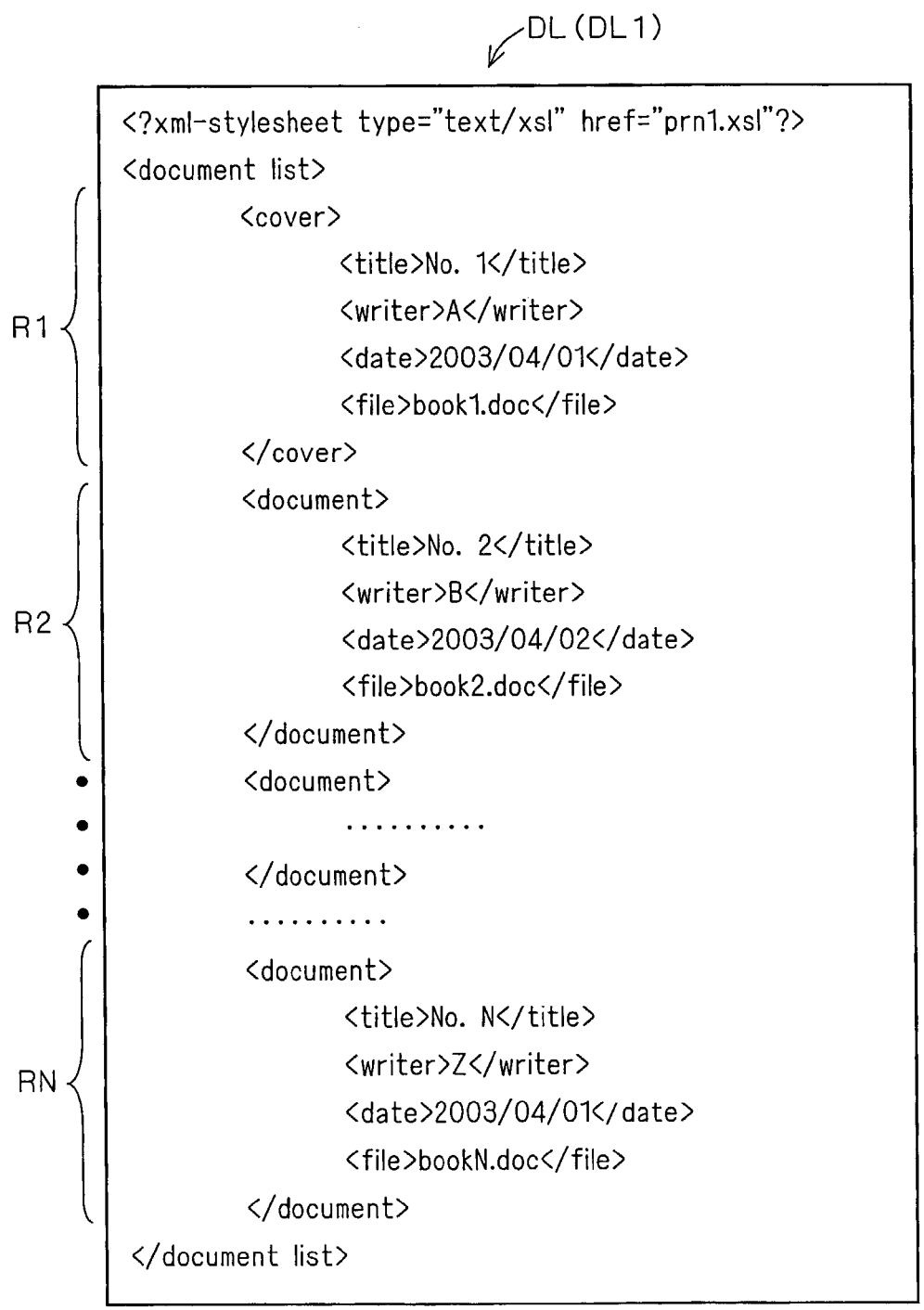
FIG. 7 shows an example of the document list DL.

Referring mainly to FIGS. 4 to 9, description will be given of a print control operation and a print output operation in the MFP 10. FIG. 5 is a flowchart showing the operations. FIG. 6 shows the relationship among the document list DL, style sheet ST, printing list PL and document data DD (DDi; i=1, 2, 3, . . . ). FIG. 7 shows an example of the document list DL, FIG. 8 shows an example of the style sheet ST, and FIG. 9 shows an example of the printing list PL.

First, in step SP10 (FIG. 5), the MFP 10 obtains the document list DL of a plurality of documents to be printed. Concretely, the document list obtaining unit 31 (FIG. 4) of the MFP 10 receives the document list DL from an external terminal via the network NW by using the communication unit 16.

More specifically, when another external device in a network (for example, LAN) transmits the document list DL to the MFP 10 with a printing instruction based on an operation by the operator of the external device, the document list obtaining unit 31 in the MFP 10 receives the document list DL via the network NW by using the communication unit 16 and stores the document list DL to a predetermined memory or the like.

The document list DL is a text document with a tag. Herein, as shown in FIG. 7, description will be given of a case where a document list DL (DL1) is constructed as an XML (eXtensible Markup Language) document.

In the document list DL, a plurality of documents to be printed are listed. Herein, there is shown a case where N file names "book1.doc", "book2.doc", . . . , and "bookN.doc" expressing N documents to be printed are written in the document list DL as an example. Information of each of the plurality of documents is sandwiched by a set of tags (<cover>, </cover>) or another set of tags (<document>, </document>).

In step SP20, the style sheet obtaining unit 32 retrieves and obtains the style sheet ST corresponding to the obtained document list DL.

In the document list DL obtained in step SP10, the style sheet ST corresponding to the document list DL is written. FIG. 7 shows a case where a style sheet with a name of "prn1.xsl" is designated in a tag <?xml-stylesheet . . . > in the head portion.

The style sheet obtaining unit 32 retrieves and obtains the designated style sheet ST from the style sheet storing unit 33. In the style sheet storing unit 33, a plurality of style sheets written in a style description language such as an XSL (eXtensible Style Language) are preliminarily stored. Therefore, the style sheet obtaining unit 32 can retrieve a style sheet ST of a name "prn1.xsl" from the plurality of style sheets stored in the style sheet storing unit 33.

The style sheet obtaining unit 32 can also obtain the style sheet ST from a predetermined storing place other than the style sheet storing unit 33. For example, in the case where the tag <?xml-stylesheet . . . > includes information indicative of not only the file name but also the existing position (storing place) of the file, the style sheet ST can be retrieved and obtained on the basis of the existence position information. Concretely, in the case where a URL (Uniform Resource Locator) including not only the file name but also a predetermined path name is written, on the basis of the URL, the style sheet ST can be obtained from a predetermined place of an external device other than the MFP 10 via the network NW and the communication unit 16.

In step SP30, the converting unit 34 converts the document list DL (FIG. 7) obtained in step SP10 into a printing list PL (FIG. 9) of a predetermined format on the basis of the style sheet ST (FIG. 8) obtained in step SP20. As described above, the converting unit 34 has the function of an XML parser.

FIG. 8 shows an example of the style sheet ST used for the converting operation. The style sheet ST of FIG. 8 is generated as an XML (eXtensible Markup Language) document. The converting operation is performed by using tag information in the document list DL.

In the style sheet ST, it is described that the whole document list DL which is inputted is replaced with description of an area QT (upper part of FIG. 8).

First, in the area QT (FIG. 8), it is described that tags "printing list" and "/printing list" are described at the head and the end of the printing list PL, respectively. In correspondence with such description, as shown in FIG. 9, the tags <printing list> and </printing list> are described at the head and the end of the converted printing list PL.

Further, in the area QT (FIG. 8), it is described between the tags <printing list> and </printing list> that (1) a portion corresponding to "document list/cover/file" of a document to which the style sheet ST is applied is to be replaced with data described in an area QA, and (2) a portion corresponding to "document list/document/file" of the document is to be replaced with data described in an area QB. In the areas QA and QB in FIG. 8, concrete data after replacement is described. In each of the areas QA and QB, it is written that the head tag <document> and an end tag </document> are to be described and the details of designation of sheet size, operation mode, and file are to be described between the tags <document> and </document>.

More concretely, it is described in the area QA that "A3" is to be described as the sheet size, "COLOR" is to be described as the operation mode, and the file name is to be transcribed as it is. It is described in the area QB that "A4" is to be described as the sheet size, "MONOCHROME" is to be described as the operation mode, and the file name is to be transcribed as it is.

The converting unit 34 converts the document list DL in accordance with the details of the instruction of the style sheet ST.

Concretely, the converting unit 34 first detects a part specified by the tags <document list>, <cover> and <file> in an area RI of the document list DL (FIG. 7) and replaces the part with the data described in the area QA of the style sheet ST. More concretely, when the part of "book1.doc" in the area RI is detected as a part specified by the tags <document list>, <cover> and <file>, the converting unit 34 converts the part in accordance with the instruction of the style sheet ST. As a result of the converting operation, as shown in FIG. 9, an instruction to set "A3" as the sheet size, to set "COLOR" as an operation mode, and to print the file "book1.doc" is described in an area LI of the printing list PL.

After that, when the part specified by the tags <document list>, <document> and <file> is detected in an area R2 of the document list DL (FIG. 7), the converting unit 34 replaces the part with the data described in the area QB of the style sheet ST. Concretely, when the part of "book2.doc" in the area R2 is detected as a part specified by the tags <document list>, <document> and <file>, the converting unit 34 converts the part in accordance with the instruction in the style sheet ST. As a result of the converting operation, as shown in FIG. 9, in an area L2 of the printing list PL, the instruction of setting "A4" as the sheet size, setting "MONOCHROME" as the operation mode, and printing the file "book2.doc" is described.

With respect to an area R3 and subsequent areas, similarly, each time the tags <document list>, <document> and <file> or tags <document list>, <cover>and <file> are detected, the converting unit 34 converts the data corresponding to the detected tags in accordance with the instruction of the style sheet ST.

By the converting operation, the document list DL is converted into the printing list PL as shown in FIG. 9 by using the tags in each document list DL. Description of the generated printing list PL is adapted to a predetermined format to which the printing list PL should be conformed. In the following, the print control operation and the print output operation are performed in accordance with the printing list PL.

In step SP40, the printing instruction unit 35 transmits a "pull print instruction" to the document data obtaining unit 36 in accordance with the printing list PL.

The "pull print instruction" means an instruction of pulling (extracting) document data of a plurality of documents described in the printing list PL from predetermined storage places and printing the plurality of documents. In the following steps SP50, SP60 and SP70, in accordance with the pull print instruction, the document data obtaining unit 36 obtains document data corresponding to a plurality of documents in the order described in the printing list PL, and the printer unit 14 performs printing and outputting on the basis of the document data.

First, in step SP50, the document data obtaining unit 36 which has received the pull print instruction actually obtains document data corresponding to one of the plurality of documents to be printed. Herein, first, document data DD1 ("book1.doc") corresponding to the document D1 is obtained.

The document data obtaining unit 36 obtains, as shown in FIG. 6 and the like, document data DDi corresponding to each document Di on the basis of the file name of each document data described in the printing list PL. Concretely, the document data obtaining unit 36 obtains the document data DDi from the document database in an external device by communication via a network. Since a case where a path name of a document database is preliminarily given as a default value is assumed herein, in FIGS. 7 and 9, a storage place of each document data DDi is not clearly shown. The document data DDi is obtained by being retrieved by using the path name of the default value as a reference. The present invention is not limited thereto but the existence position of each document data may be specified by giving a name including a path name as a file name of the document data.

In the following step SP60, the document data obtaining unit 36 outputs print data for printing and outputting the document data DDi (the first one is DD1) obtained by the document data obtaining unit 36 to the printer unit 14. The printer unit 14 performs the printing and outputting on the basis of the print output data which is outputted from the document data obtaining unit 36.

In step SP70, whether the printing and outputting of the last document data is finished or not is determined. If document data which is not outputted remains, the program returns to step SP50 and a similar operation is repeated.

Returning to step SP50, the document data obtaining unit 36 obtains document data DD2 ("book2.doc") corresponding to the next document D2. In step SP60, the printer unit 14 performs the printing and outputting on the basis of the received document data DD2. In step SP70, the end determining operation is executed again. If document data which is not outputted remains, the program returns to step SP50.

When the printing and outputting of all of (herein, N) documents is finished by repeating the operations in steps SP50, SP60 and SP70 as described above, it is determined in step SP70 that the printing and outputting of all of document data is finished. When such determination is made, the MFP 10 finishes the continuous printing and outputting operation.

As described above, the MFP 10 generates the data for printing and outputting, the data including instructions to print a plurality of documents in an instructed printing style in accordance with the instructed order. The MFP 10 controls the printing and outputting in the printer unit 14 on the basis of the data for printing and outputting. The printer unit 14 can print a plurality of documents in accordance with the print control operation. At the time of printing a plurality of documents, therefore, it is unnecessary for the operator of the MFP 10 to designate the next document to be printed each time printing of one document is finished, so that the time and effort can be saved.

FIG. 10 shows another document list DL (DL2). Although the document list DL2 is used to obtain the same printing and outputting result as that of the document list DL1, as will be described below, the document list DL2 has a format different from that of the document list DL1.

Concretely, the document list DL2 matches the document list DL1 with respect to the point that information regarding each document to be printed and output is described in the part sandwiched by the tags <cover> and </cover> or the tags <document> and </document>, but is different from the document list DL1 with respect to the following point.

In the document list DL2, information regarding each document is divided into two large items of "information" and "file" and, in the large item of "information", small items of "title", "writer", and "date" are further provided. On the other hand, in the document list DL1, the large item of "information" is not provided, though the small items of "title", "writer", and "date" are provided. As described above, the two document lists are different from each other in the methods of dividing information of documents listed (the item dividing methods).

Although the document lists DL1 and DL2 have such a difference, they have the part specified by the tags <document list>, <cover> and <file> and the part specified by the tags <document list>, <document> and <file>, and the data to be specified by the parts is the same (each of the parts specifies the file name of the document data to be printed). Therefore, there is no trouble to apply the style sheet ST. When the different point between the document lists DL1 and DL2 is within a range of a predetermined degree (within a permissible range), the same style sheet ("prn1.xsl") can be applied.

By applying the same style sheet ST as that of the document list DL1 to the document list DL2, the same printing list PL (FIG. 9) can be obtained as a result of the conversion.

As described above, by each of the document list DL1 of the format as shown in FIG. 7 and the document list DL2 of the format as shown in FIG. 10, the same printing list PL (FIG. 9) can be generated and the same print output result can be obtained. In other words, by lessening of requirements of the format of the document list DL, the creator of the document list can generate the document list DL in a relatively free format without being constrained in a single form. That is, the document lists of various formats can be utilized to print a plurality of documents in a lump.

For a document list DL3 (not shown) whose format is largely different from that of the document list DL1, it is sufficient to generate a proper separate style sheet ST3 (not shown) and convert the document list DL3 to the printing list PL on the basis of the style sheet ST3. Even in the case where the formats of document lists DL are different from each other to a degree that the same style sheet ST cannot be applied, by using the style sheets ST adapted to the corresponding document lists DL, the printing list PL of a predetermined format (the same format) can be generated. In other words, any document list can be used as long as its format can be converted to a printing list of a predetermined format on the basis of the style sheet corresponding to the document list.

As described above, the same printing list PL (FIG. 9) can also be generated from the document list DL3 of a different format, and the same print output result can be obtained. As described above, by lessening the requirements of the format of the document list DL, the creator of the document list can generate the document list DL in a relatively free format without the constraint of a single format. That is, the creator of the document list DL can describe the document list DL by using any document list of an increasing variety of formats, and can perform the print control for printing a plurality of documents more flexibly.

According to the embodiment, the document list DL is generated as a text document with a tag (more specifically, an XML document). As described above, the document list DL is not constructed by binary data but is constructed by a text document which can be recognized as characters. Consequently, there are advantages such that the document list DL is easy to understand for the operator and processing such as edition is easy.

C. Others

Although the print system 1 in which the MFP 10 as an apparatus for controlling a printer is connected to the external terminal 40 and server 50 via a network has been described as an example in the above-described embodiment, the present invention is not limited thereto. For example, the apparatus for controlling a printer is not necessary to be connected to other devices via a network, but local connection may be established in the apparatus. Further, the present invention can be carried out by a stand-alone type apparatus for controlling a printer.

In the above-described embodiment, the case of receiving the document list DL from an external device via the network NW in step SP10 is described, but the present invention is not limited thereto. For example, the operator of the MFP 10 may enter a print instruction based on a predetermined document list stored in the storing unit 23 or the like in the MFP 10 by using the operating unit 11 and/or display 12.

Although the document data DDi is obtained from an external device via a network in step SP50 in the above-described embodiment, the present invention is not limited thereto. For example, it is also possible to provide a document database in the MFP 10 and obtain predetermined document data DDi from the document database in the MFP 10.

Further, the timing of obtaining the document data DDi is not limited to that of the above-described embodiment. For example, in step SP10, the document data DDi may be obtained in addition to the document list DL.

In the above-described embodiment, the case where the title of the style sheet ST corresponding to the document list DL is described in the document list DL itself and the style sheet ST is specified on the basis of the title has been described. However, the present invention is not limited thereto. For example, it is also possible to provide a table specifying the relation between the document list DL and the style sheet ST, specify the style sheet ST corresponding to the document list DL on the basis of information of the table, and retrieve and obtain the specified style sheet ST.

Further, in the above-described embodiment, the MFP also having the print output function has been described as an example of the print control apparatus. However, the present invention is not limited thereto. The present invention can be applied to any apparatus as long as the apparatus can perform the print control.

For example, the print control apparatus of the present invention may be realized as a printing device (printer) which does not have functions of a scanner, a copier, a facsimile and the like but has both a print control function and a print output function.

Alternately, a print output function may be provided as a separate print output device and the print control apparatus of the present invention may be realized as a print control apparatus for performing a controlling operation on the print output device. More concretely, by executing a predetermined program in a computer such as a personal computer, the print control apparatus having the functions may be realized. The technical idea can be applied not only to apparatuses but also a program itself for realizing the functions as described above. Such a program can be provided in a state where it is recorded in any of various recording media such as a memory card and a CD-ROM. The print control apparatus (for example, MFP or personal computer) reads the program recorded on the recording medium and executes the program by using a CPU or the like in the apparatus, thereby enabling the various functions as described above. Further, the print control apparatus may receive such a program by downloading the program from a predetermined server or the like via a network.

While the invention has been shown and described in detail, the foregoing description is in all aspects illustrative and not restrictive. It is therefore understood that numerous modifications and variations can be devised without departing from the scope of the invention.

What is claimed is:

1. An apparatus for controlling a printer, said apparatus comprising:
    a first obtaining unit for obtaining a document list in which a plurality of documents to be printed are listed, the document list being a text document with a tag;
    a second obtaining unit for obtaining a style sheet corresponding to the document list obtained by said first obtaining unit, the obtained style sheet designating a plurality of different formats in which the plurality of documents are to be respectively printed;
    a processing unit for converting the obtained document list into a printing list in which the plurality of documents are each respectively associated with one of the plurality of formats in which to be printed among the plurality of formats, by using the tag in the document list on the basis of the obtained style sheet; and
    a print instructing unit for instructing the printer to sequentially print each of the plurality of documents listed in the printing list in the respective format of each one of the plurality of documents.

2. The apparatus according to claim 1, wherein the document list is an XML document.

3. The apparatus according to claim 2, wherein the style sheet is an XML document.

4. The apparatus according to claim 1, wherein said first obtaining unit is operable to obtain the document list by receiving the document list from an external device via a network.

5. The apparatus according to claim 1, further comprising a storage unit for storing the style sheet,
    wherein said second obtaining unit is operable to obtain the style sheet corresponding to the document list by reading the style sheet from said storage unit.

6. The apparatus according to claim 1, wherein:
    the document list obtained by said first obtaining unit is a text document with a plurality of tags respectively identifying information of each of the plurality of documents to be printed, and is divided into a plurality of parts respectively associated with the plurality of documents to be printed;
    said second obtaining unit is operable to select and obtain, from among a plurality of style sheets, the style sheet corresponding to the document list obtained by said first obtaining unit, the obtained style sheet including a first area designating the plurality of formats according to an arrangement of the tags included in the obtained document list, and a plurality of second areas each identifying format information of a corresponding one of the plurality of formats;

said processing unit is operable to convert the obtained document list into the printing list having a predetermined format for each part of the document list, by assigning one of the plurality of formats designated in the first area of the obtained style sheet to each part of the document list according to the arrangement of tags identifying the information of each document respectively corresponding to each part of the document list, and replacing the information of each part of the document list with the format information of the assigned one of the plurality of formats; and said print instructing unit is operable to instruct the printer to sequentially print the plurality of documents listed in the printing list in accordance with the respectively assigned one of the plurality of formats for each one of the plurality of documents.

7. The apparatus according to claim 6, wherein each part of the document list is further divided into subparts identifying at least one of a title, author, date and file name of the corresponding one of the plurality of the documents to be printed.

8. The apparatus according to claim 6, wherein the format information of each of the plurality of formats designated in the obtained style sheet is divided into parts identifying at least one of a printing sheet size, a printing operation mode and a file name transcription mode for the corresponding one of the plurality of documents listed in the document list.

9. The apparatus according to claim 6, wherein the style sheet corresponding to the document list is identified in the document list obtained by said first obtaining unit, and said second obtaining unit is operable to select and obtain the style sheet from among the plurality of style sheets by detecting the style sheet identified in the document list.

10. The apparatus according to claim 6, further comprising a storage unit for storing the plurality of style sheets, wherein the style sheet corresponding to the document list is identified in the document list obtained by said first obtaining unit, and said second obtaining unit is operable to obtain the style sheet corresponding to the document list by detecting the style sheet identified in the document list and reading the detected style sheet from said storage unit.

11. The apparatus according to claim 6, wherein the style sheet corresponding to the document list contains a different format for at least two of the plurality of documents listed in the document list.

12. The apparatus according to claim 6, wherein the printing list converted by said processing unit lists each of the plurality of documents listed in the document list by a respective file name identified in the document list.

13. The apparatus according to claim 12, further comprising:

a storage unit for storing document data respectively corresponding to each of the plurality of documents listed in the printing list; and a document data obtaining unit for obtaining the document data of the plurality of documents from said storage unit on the basis of the respective file name of each of the plurality of documents listed in the printing list, wherein said print instructing unit is operable to instruct the printer to sequentially print the plurality of documents listed in the printing list in accordance with the respectively assigned one of the plurality of formats for each one of the plurality of documents.

14. The apparatus according to claim 13, wherein said document data obtaining unit is operable to sequentially obtain the document data respectively corresponding to the plurality of documents in the order in which the plurality of documents are listed in the printing list, and said print instructing unit is operable to instruct the printer to sequentially print the document data of each document in the order that said document data obtaining unit obtains the document data.

15. A computer-readable medium having a computer program product stored thereon for causing a computer to execute processing operations for controlling a printer, said processing operations comprising:

obtaining a document list in which a plurality of documents to be printed are listed, the document list being a text document with a tag;

obtaining a style sheet corresponding to the obtained document list, the obtained style sheet designating a plurality of different formats in which the plurality of documents are to be respectively printed;

converting the obtained document list into a printing list in which the plurality of documents are each respectively associated with one of the plurality of formats in which to be printed among the plurality of formats, by using the tag in the document list on the basis of the obtained style sheet; and instructing the printer to sequentially print each of the plurality of documents listed in the printing list in the respective format of each one of the plurality of documents.

16. The computer-readable medium according to claim 15, wherein the document list is an XML document.

17. The computer-readable medium according to claim 16, wherein the style sheet is an XML document.

18. The computer-readable medium according to claim 15, wherein:

the document list obtained in said document list obtaining operation is a text document with a plurality of tags respectively identifying information of each of the plurality of documents to be printed, and is divided into a plurality of parts respectively associated with the plurality of documents to be printed;

said style sheet obtaining operation comprises selecting and obtaining, from among a plurality of style sheets, the style sheet corresponding to the obtained document list, the obtained style sheet including a first area designating the plurality of formats according to an arrangement of the tags included in the obtained document list, and a plurality of second areas each identifying format information of a corresponding one of the plurality of formats;

said converting operation comprises converting the obtained document list into the printing list having a predetermined format for each part of the document list, by assigning one of the plurality of formats designated in the first area of the obtained style sheet to each part of the document list according to the arrangement of tags identifying the information of each document respectively corresponding to each part of the document list, and replacing the information of each part of the document list with the format information of the assigned one of the plurality of formats; and said instructing operation comprises instructing the printer to sequentially print the plurality of documents listed in the printing list in accordance with the respectively assigned one of the plurality of formats for each one of the plurality of documents.

19. The computer-readable medium according to claim 18, wherein the obtained style sheet corresponding to the document list contains a different format for at least two of the plurality of documents listed in the document list.

20. The computer-readable medium according to claim 18, wherein:

the printing list converted in said converting operation lists each of the plurality of documents listed in the document list by a respective file name identified in the document list;

said converting operation further comprises storing document data respectively corresponding to each of the plurality of documents listed in the printing list, and obtaining the stored document data of the plurality of documents listed in the printing list on the basis of the respective file name of the plurality of documents listed in the printing list; and said instructing operation comprises instructing the printer to sequentially print the document data of the plurality of documents listed in the printing list in accordance with the respectively assigned one of the plurality of formats for each one of the plurality of documents.

21. A method for controlling a printer, said method comprising the following steps of:

obtaining a document list in which a plurality of documents to be printed are listed, the document list being a text document with a tag;

obtaining a style sheet corresponding to the obtained document list, the obtained style sheet designating a plurality of different formats in which the plurality of documents are to be respectively printed;

converting the obtained document list into a printing list in which the plurality of documents are each respectively associated with one of the plurality of formats in which to be printed among the plurality of formats, by using the tag in the document list on the basis of the obtained style sheet; and instructing the printer to sequentially print each of the plurality of documents listed in the printing list in the respective format of each one of the plurality of documents.

22. The method according to claim 21, wherein the document list is an XML document.

23. The method according to claim 22, wherein the style sheet is an XML document.

24. The method according to claim 21, wherein:

the document list obtained in said document list obtaining step is a text document with a plurality of tags respectively identifying information of each of the plurality of documents to be printed, and is divided into a plurality of parts respectively associated with the plurality of documents to be printed;

said style sheet obtaining step comprises selecting and obtaining, from among a plurality of style sheets, the style sheet corresponding to the obtained document list, the obtained style sheet including a first area designating the plurality of formats according to an arrangement of the tags included in the obtained document list, and a plurality of second areas each identifying format information of a corresponding one of the plurality of formats;

said converting step comprises converting the obtained document list into the printing list having a predetermined format for each part of the document list, by assigning one of the plurality of formats designated in the first area of the obtained style sheet to each part of the document list according to the arrangement of tags identifying the information of each document respectively corresponding to each part of the document list, and replacing the information of each part of the document list with the format information of the assigned one of the plurality of formats; and said instructing step comprises instructing the printer to sequentially print the plurality of documents listed in the printing list in accordance with the respectively assigned one of the plurality of formats for each one of the plurality of documents.

25. The method according to claim 24, wherein the obtained style sheet corresponding to the document list contains a different format for at least two of the plurality of documents listed in the document list.

26. The method according to claim 24, wherein:

the printing list converted in said converting step lists each of the plurality of documents listed in the document list by a respective file name identified in the document list;

said converting step further comprises storing document data respectively corresponding to each of the plurality of documents listed in the printing list, and obtaining the stored document data of the plurality of documents listed in the printing list on the basis of the respective file name of the plurality of documents listed in the printing list; and said instructing step comprises instructing the printer to sequentially print the document data of the plurality of documents listed in the printing list in accordance with the respectively assigned one of the plurality of formats for each one of the plurality of documents.

* * * * *